United States Patent [19]

Dehnert et al.

[11] 4,344,880

[45] Aug. 17, 1982

[54] DISAZO DYESTUFFS HAVING AN ACYLAMINO GROUP AND AN AROMATIC-OXY GROUP ON DIFFERENT TERMINAL MOIETIES

[75] Inventors: Johannes Dehnert, Ludwigshafen; Werner Juenemann, Bad Durkheim, both of Fed. Rep. of Germany

[73] Assignee: BASF Aktiengesellschaft, Ludwigshafen, Fed. Rep. of Germany

[21] Appl. No.: 203,809

[22] Filed: Nov. 3, 1980

[30] Foreign Application Priority Data

Dec. 1, 1979 [DE] Fed. Rep. of Germany ....... 2948456

[51] Int. Cl.$^3$ ............ C07C 107/04; C09B 43/128; C09B 43/132; C09B 43/28
[52] U.S. Cl. .................... 260/152; 260/174; 260/177; 260/184; 260/185; 260/186; 260/187; 260/191
[58] Field of Search ............ 260/187, 186, 174, 177, 260/184, 185, 152

[56] References Cited

U.S. PATENT DOCUMENTS 2,563,091 8/1951 Wright ................. 260/187
3,451,991 6/1969 Kleiner ................. 260/187
3,904,596 9/1975 Blackwell et al. ........... 260/187

FOREIGN PATENT DOCUMENTS 1099097 1/1968 United Kingdom ........... 260/187
1387811 3/1975 United Kingdom ........... 260/187

*Primary Examiner*—Charles F. Warren
*Attorney, Agent, or Firm*—Oblon, Fisher, Spivak, McClelland & Maier

[57] ABSTRACT

Disazo dyes of the general formula I

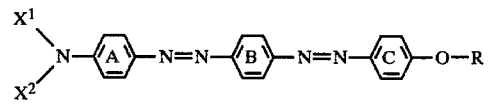

where R is an araliphatic or aromatic radical, $X^1$ is

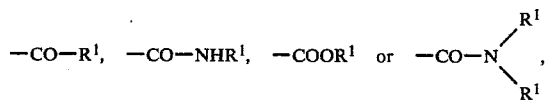

$X^2$ is hydrogen, phenyl or an aliphatic or araliphatic radical, $R^1$ is hydrogen or an aliphatic, cycloaliphatic, araliphatic or aromatic radical, the rings A, B and C may be substituted and the rings B and C may carry a fused benzo ring, and the group

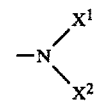

may also be a heterocyclic radical of the formula

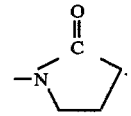

The novel dyes are very suitable for dyeing polyesters and cellulose.

9 Claims, No Drawings

DISAZO DYESTUFFS HAVING AN ACYLAMINO GROUP AND AN AROMATIC-OXY GROUP ON DIFFERENT TERMINAL MOIETIES

The present invention relates to dyes of the general formula I

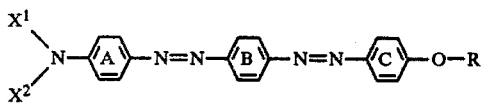

where R is an araliphatic or aromatic radical, $X^1$ is $-CO-R^1$, $-CO-NHR^1$, $-COOR^1$ or $-CO-N\begin{matrix}R^1\\R^1\end{matrix}$, $X^2$ is hydrogen, phenyl or an aliphatic or araliphatic radical, $R^1$ is hydrogen or an aliphatic, cycloaliphatic, araliphatic or aromatic radical, the rings A, B and C may be substituted and the rings B and C may carry a fused benzo ring, and the group

may also be a heterocyclic radical of the formula

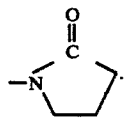

Examples of radicals $R^1$ are hydrogen, alkenyl, $C_1$-$C_{12}$-alkyl which may be interrupted by oxygen and may be substituted by hydroxyl, by chlorine, by bromine, by unsubstituted or substituted carbamyl, by cyano, by $C_1$-$C_8$-alkoxy, by $C_1$-$C_8$-alkanoyloxy or by unsubstituted or substituted phenyl, cycloalkyl of 5 to 8 carbon atoms and phenyl which is unsubstituted or substituted by methyl, ethyl or chlorine.

Specific examples of $R^1$ are hydrogen, $CH_3$, $C_2H_5$, n—$C_3H_7$, n—$C_4H_9$, n—$C_6H_{13}$, $CH_2$—$CH(C_2H_5)C_4H_9$—n, n—$C_8H_{17}$, n—$C_{10}H_{21}$, n—$C_{12}H_{25}$, —$C_2H_4OCH_2CH(C_2H_5)C_4H_9$—n, $CH_2CH$=$CH_2$, —$C_2H_4Cl$, —$C_2H_4Br$, —$C_2H_4OCH_3$, —$C_2H_4OC_2H_5$, —$C_2H_4OC_6H_5$, —$C_6H_{11}$, —$C_6H_5$, —$C_6H_4CH_3$, —$C_6H_4Cl$, —$C_6H_4C_2H_5$, —$CH_2$—$C_6H_5$, —$CH_2$—$C_6H_4$—$CH_3$, —$CH_2C_6H_4Cl$, —$CH_2C_6H_3Cl_2$, $CH_2C_6H_4NO_2$, —$CH_2$—$C_6H_4CN$, —$C_2H_4C_6H_5$, —$C_3H_6C_6H_5$, $C_2H_4OC_6H_5$, —$C_3H_6$—$CN$, —$CH_2$—$CONH_2$, —$CH_2CON(CH_3)_2$, $CH_2CON(C_2H_5)_2$, $CH_2CONHC_6H_5$, —$CH_2CO_2CH_3$, —$CH_2CO_2C_2H_5$, —$CH_2CO_2C_4H_9$, —$CH_2$—$CO$—$CH_3$, $CH_2COC_6H_5$, —$CH_2$—$CH(OH)C_6H_5$, —$CH_2$—$CH(OH)CH_2OC_6H_5$, $CH_2CH(OH)C_2H_5$, —$C_2H_4OCOCH_3$, —$C_2H_4OCOC_3H_7$, —$CH_2CH(C_2H_5)OCOCH_3$, $CH_2CH(C_2H_5)OCOC_2H_5$,

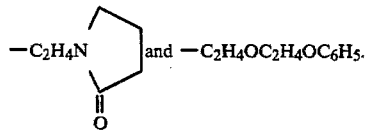

and —$C_2H_4OC_2H_4OC_6H_5$.

The ring B may be substituted by, for example, chlorine, bromine, methyl, ethyl, acetylamino, $C_1$-$C_4$-alkoxy or phenoxy or may carry a fused benzo ring which is unsubstituted or substituted by methoxy or ethoxy.

Examples of substituents of the ring C are chlorine, methyl, ethyl, methoxy, ethoxy, phenyl and acetylamino.

Examples of substituents of the ring A are chlorine, methyl and $C_1$-$C_4$-alkoxy.

Examples of araliphatic radicals R are —$CH_2$—$C_6H_5$, —$CH_2$—$C_6H_4$—$Cl$, —$CH_2$—$C_6H_3Cl_2$, —$CH_2$—$C_6H_4NO_2$, —$CH_2$—$C_6H_4$—$CN$, —$C_2H_4$—$C_6H_5$, —$C_3H_6$—$C_6H_5$, —$C_2H_4$—$O$—$C_6H_5$, —$C_2H_4OC_2H_4OC_6H_5$, —$CH_2$—$CO$—$C_6H_5$—$CH_2$—$CH(CH_3)$—$C_6H_5$ and —$CH_2$—$C_6H_4$—$CH_3$.

Examples of aromatic radicals R are phenyl and p-chlorophenyl.

A compound of the formula I may be prepared by introducing the radical R by a conventional method into a compound of the formula II

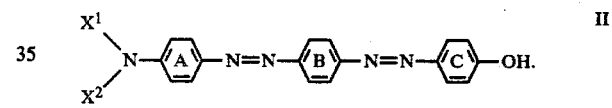

For example, for aralkylation of the phenolic OH it is possible to use unsubstituted and substituted aralkyl chlorides and bromides and unsubstituted and substituted diaralkyl sulfates.

The etherification is carried out in a conventional manner, for example in an aqueous alkaline medium, in an aqueous-organic alkaline medium or under anhydrous conditions in an organic solvent in the presence of an acid acceptor. The reaction is most advantageously carried out at from 50° to 160° C., where necessary, in the case of low-boiling solvents, in an autoclave.

A further method of preparation of a dye of the formula I is the conventional acylation of a compound of the formula III

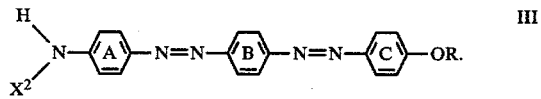

Details of the preparation may be found in the Examples, where parts and percentages are by weight, unless stated otherwise.

Suitable dyeing processes for applying a dye of the formula I are, in particular, those described in German Pat. No. 1,811,796 and German Laid-Open Applications Nos. 2,524,243, 2,528,743 and 2,855,188.

Industrially particularly valuable compounds are those of the general formula I a washing it with water and drying it, 38 parts of the dye of the formula

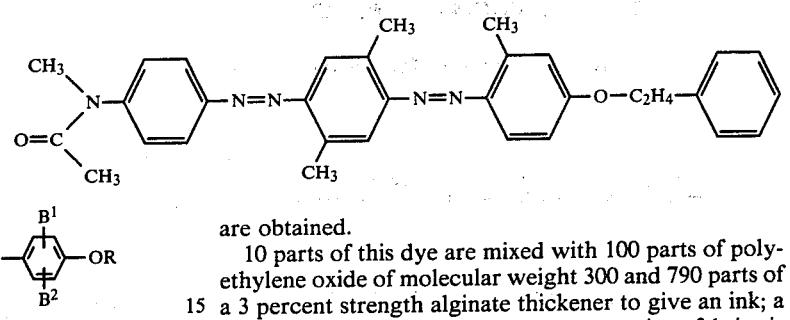

are obtained.

10 parts of this dye are mixed with 100 parts of polyethylene oxide of molecular weight 300 and 790 parts of a 3 percent strength alginate thickener to give an ink; a 65:35 (by weight) polyester/cotton union fabric is printed with this ink by rotary screen printing and is then dried at 100° C. Thereafter, the fabric is treated for 2 minutes with live steam at 200° C., rinsed cold, soaped at the boil, again rinsed cold and dried. A lightfast, washfast, solvent-fast and sublimation-fast yellowish orange print on a white ground is obtained. Printing on a pure cotton fabric gives a similar result.

$\lambda_{max}$: 402

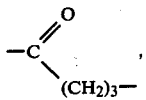

where $B^1$ is hydrogen, chlorine, methyl, ethyl, phenyl, methoxy or ethoxy, $B^2$ is hydrogen, chlorine or methyl, $B^3$ is hydrogen, chlorine, methyl, ethyl, acetylamino or $C_1$–$C_4$-alkoxy, $B^4$ is hydrogen, methyl or $C_1$–$C_4$-alkoxy, $B^3$ and $B^4$ together may also be a fused benzo ring, $B^5$ is hydrogen, methyl, chlorine or $C_1$–$C_4$-alkoxy, $B^6$ is hydrogen, methyl or $C_1$–$C_4$-alkoxy, $X^3$ is $C_1$–$C_8$-alkanoyl or benzoyl, $X^4$ is hydrogen, $C_1$–$C_4$-alkyl or phenyl, $X^3$ and $X^4$ together may also be a radical of the formula $$-C\underset{(CH_2)_3-}{\overset{O}{\diagup\!\!\!\diagdown}}$$

and R has the stated meanings.

Examples of preferred radicals $X^3$ are —COH, —COCH$_3$, —COC$_2$H$_5$, —COC$_3$H$_7$, —CO$_2$CH$_3$, —CO$_2$C$_2$H$_5$ and —CON(CH$_3$)$_2$.

Examples of preferred radicals R are CH$_2$—C$_6$H$_5$, —CH$_2$—C$_6$H$_4$Cl, —C$_2$H$_4$—C$_6$H$_5$, —C$_2$H$_4$O—C$_6$H$_5$, —C$_2$H$_4$OC$_2$H$_4$OC$_6$H$_5$, —C$_6$H$_5$ and C$_6$H$_4$Cl.

The $\lambda_{max}$ values mentioned in the Examples which follow were measured in dimethylformamide and are in nm.

EXAMPLE 1

33 parts of the dye of the formula

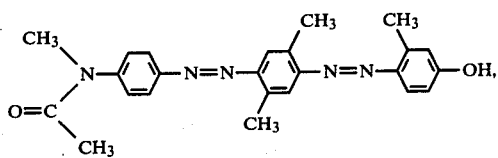

42 parts of potassium carbonate, 51 parts by volume of 2-phenylethyl bromide and 0.4 part of potassium iodide in 225 parts by volume of N-methylpyrrolidone are stirred for 6 hours at 120° C. The batch is poured into 600 parts of methanol, and the product is precipitated with 1,000 parts of water, these operations being carried out at room temperature. After filtering off the product,

EXAMPLE 2

22.8 parts of the dye of the formula

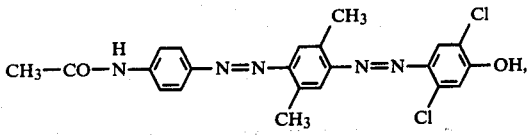

20.9 parts of potassium carbonate and 25 parts of benzyl chloride in 150 parts of N-methylpyrrolidone are stirred for 4 hours at 110° C. 600 parts of methanol are then added to the batch at room temperature, and the precipitate is filtered off, washed with methanol and water and dried. 17 parts of the dye of the formula

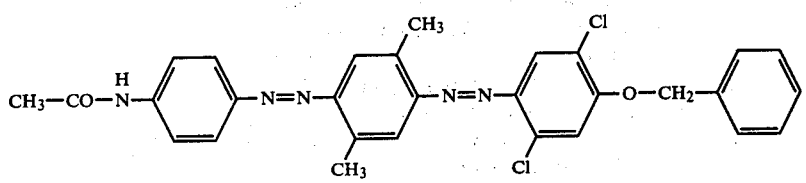

are obtained.

A fabric of 65 parts of polyester fibers and 35 parts of mercerized cotton is impregnated with a liquor which contains 10 g/l of a 20% strength liquid formulation of the above disperse dye and 80 g/l of a swelling agent and dye solvent comprising a mixture of 3 parts of polyethylene glycol of molecular weight 1,500 and 1 part of an adduct of one mole of neopentanediamine with 15.6 moles of ethylene oxide. The pH of the padding liquor is brought to 6 with glutaric acid. The fabric is impregnated with the padding liquor at a wet pick-up of 45%. It is then dried for 60 seconds at 120° C. and fixed for 90 seconds at 225° C. in a laboratory model of continuous dryer. The fabric is then rinsed cold and warm and washed for 5 minutes at 100° C. in the presence of a commercial detergent. Fixing of the dye to the fabric is virtually complete. A golden yellow dyeing having good lightfastness, wash-fastness and fastness to crocking is obtained.

$\lambda_{max}$: 410

EXAMPLE 3

25 parts of the dye of the formula

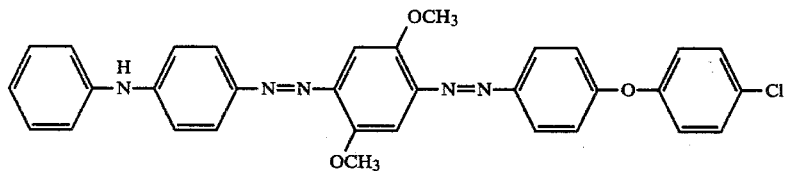

in 100 parts by volume of propionic anhydride containing 2 parts of 4-dimethylaminopyridine are stirred at 110°–120° C. until the starting material is no longer detectable by thin layer chromatography. The product is filtered off at room temperature, washed with methanol and dried under reduced pressure at 60° C. 15.5 parts of the dye of the formula

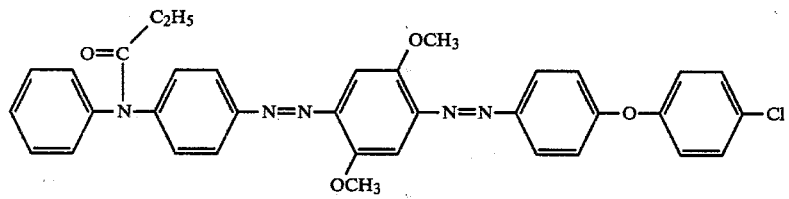

are obtained.

When used in the dyeing process described in the preceding Example, this dye is virtually completely fixed to the fabric. The dyeing is reddish orange and has good lightfastness and washfastness.

$\lambda_{max}$: 380

The dyes shown in the Table are obtained similarly and can be used, by the stated methods, to dye and print cotton and union fabrics, on which they give dyeings having good fastness characteristics.

The dyes mentioned in the Tables which follow can be converted to a commercially useful dye formulation as follows: 30 parts of dye, 6 parts of dispersant, 10 parts of humectant, 1 part of disinfectant and about 53 parts of water are milled in a stirred ball until the particle size is about 0.5 μm. The resulting dye dispersion has a good shelf life.

The substituents $X^1$, $X^2$ and $T^1$–$T^6$ of the dyes listed in the Table which follows, and the positional indices shown in various columns of the Table, correspond to the formula IV

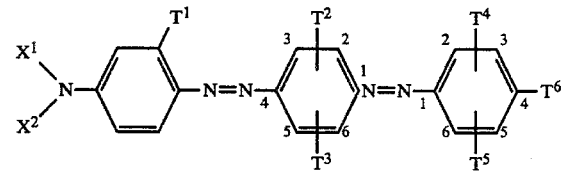

| Example | $X^1$ | $X^2$ | $T^1$ | $T^2$ | $T^3$ | $T^4$ | $T^5$ | $T^6$ | Hue | $\lambda_{max}$ |
|---|---|---|---|---|---|---|---|---|---|---|
| 4 | —CO—CH$_3$ | CH$_3$ | H | 2-CH$_3$ | 5-CH$_3$ | 2-CH$_3$ | H | OCH$_2$C$_6$H$_5$ | golden yellow | 403 |
| 5 | " | " | " | " | " | " | " | OCH$_2$CH$_2$OC$_6$H$_5$ | golden yellow | 403 |
| 6 | " | " | " | " | " | " | " | OC$_2$H$_4$OC$_2$H$_4$OC$_6$H$_5$ | golden yellow | 402 |
| 7 | " | " | " | " | " | " | " | OCH$_2$C$_6$H$_5$—o-Cl | golden yellow | 400 |
| 8 | " | " | " | " | " | H | " | OCH$_2$C$_6$H$_5$ | golden yellow | 403 |
| 9 | " | " | " | " | " | " | " | OC$_2$H$_4$C$_6$H$_5$ | golden yellow | 402 |
| 10 | " | " | " | " | " | " | " | OC$_2$H$_4$OC$_6$H$_5$ | golden yellow | 402 |
| 11 | " | " | " | " | " | " | " | OCH$_2$C$_6$H$_4$Cl—o | golden yellow | 402 |
| 12 | " | " | " | " | " | " | " | " | golden yellow | 403 |
| 13 | " | " | " | " | " | " | " | OCH$_2$C$_6$H$_4$CH$_3$ | golden yellow | 402 |
| 14 | " | " | " | " | " | " | " | OCH$_2$C$_6$H$_4$—Cl—p | golden yellow | 403 |
| 15 | " | " | " | " | " | 2-Cl | 5-Cl | OCH$_2$C$_6$H$_5$ | golden yellow | 408 |
| 16 | " | " | " | " | " | " | " | OC$_2$H$_4$OC$_6$H$_5$ | golden yellow | 406 |
| 17 | " | " | " | " | " | 3-CH$_3$ | H | " | golden yellow | 404 |
| 18 | " | " | " | 2-OCH$_3$ | " | 2-CH$_3$ | " | " | orange | 414 |

-continued

| | | | | | | | | | |
|---|---|---|---|---|---|---|---|---|---|
| 19 | " | " | " | " | " | " | " | OCH$_2$C$_6$H$_5$ | " | 414 |
| 20 | " | " | " | 2-OCH$_3$ | " | " | " | " | reddish orange | 485 |
| 21 | " | " | " | " | " | " | " | OC$_2$H$_4$C$_6$H$_5$ | reddish orange | 486 |
| 22 | " | " | " | " | " | " | " | OC$_2$H$_4$OC$_6$H$_5$ | reddish orange | 485 |
| 23 | " | " | " | " | " | " | " | OC$_2$H$_4$OC$_2$H$_4$OC$_6$H$_5$ | reddish orange | 485 |
| 24 | " | H | " | 2-CH$_3$ | " | 2-Cl | " | OC$_2$H$_4$C$_6$H$_5$ | golden yellow | 411 |
| 25 | " | " | " | " | " | " | " | OC$_2$H$_4$OC$_6$H$_5$ | golden yellow | 410 |
| 26 | " | " | " | " | " | " | " | OC$_2$H$_4$OC$_2$H$_4$OC$_6$H$_5$ | golden yellow | 411 |
| 27 | " | " | " | " | " | " | " | OCH$_2$CH(CH$_3$)C$_6$H$_5$ | golden yellow | 411 |
| 28 | " | " | " | 2-OCH$_3$ | " | " | " | OCH$_2$C$_6$H$_5$ | golden yellow | 426 |
| 29 | " | " | " | " | " | " | " | OC$_2$H$_4$C$_6$H$_5$ | golden yellow | 426 |
| 30 | " | " | " | " | " | " | " | OC$_2$H$_4$OC$_6$H$_5$ | golden yellow | 425 |
| 31 | " | " | " | 2-OCH$_3$ | " | 2-CH$_3$ | H | " | reddish orange | 486 |
| 32 | " | " | " | " | " | " | " | OC$_2$H$_4$C$_6$H$_5$ | reddish orange | 486 |
| 33 | " | " | " | " | " | " | " | OCH$_2$C$_6$H$_5$ | reddish orange | 486 |
| 34 | " | " | " | " | " | H | " | " | reddish orange | 484 |
| 35 | " | " | " | " | 5-OCH$_3$ | H | " | OC$_2$H$_4$OC$_6$H$_5$ | reddish orange | 485 |
| 36 | " | " | " | 2-CH$_3$ | 5-CH$_3$ | 2-CH$_3$ | " | " | golden yellow | 406 |
| 37 | " | " | " | " | " | " | " | OCH$_2$C$_6$H$_5$ | golden yellow | 406 |
| 38 | " | " | " | " | " | " | " | OC$_2$H$_4$C$_6$H$_5$ | golden yellow | 405 |
| 39 | " | " | " | " | " | H | " | " | golden yellow | 406 |
| 40 | " | " | " | " | " | " | " | OCH$_2$C$_6$H$_5$ | golden yellow | 403 |
| 41 | " | " | " | " | " | " | 3-CH$_3$ | " | golden yellow | 405 |
| 42 | " | " | " | " | " | " | " | OC$_2$H$_4$OC$_6$H$_5$ | golden yellow | 405 |
| 43 | " | " | " | " | " | " | " | OC$_2$H$_4$C$_6$H$_5$ | golden yellow | 405 |
| 44 | " | " | " | 2-OCH$_3$ | " | " | " | " | orange | 425 |
| 45 | " | " | " | " | " | 2-CH$_3$ | H | " | " | 426 |
| 46 | " | " | " | 2-CH$_3$ | 5-OCH$_3$ | " | " | OCH$_2$C$_6$H$_5$ | " | 425 |
| 47 | " | " | " | " | " | " | " | OC$_2$H$_4$OC$_6$H$_5$ | " | 426 |
| 48 | " | " | " | 3-CH$_3$ | H | " | " | " | golden yellow | 404 |
| 49 | " | " | " | " | " | H | " | " | golden yellow | 403 |
| 50 | " | " | " | " | " | " | " | OC$_2$H$_4$C$_6$H$_5$ | golden yellow | 403 |
| 51 | " | " | " | " | " | " | " | OCH$_2$C$_6$H$_5$ | golden yellow | 403 |
| 52 | " | " | " | 3-OCH$_3$ | " | " | " | " | orange | 415 |
| 53 | " | " | " | 2-OCH$_3$ | " | 2-Cl | 5-Cl | " | " | 430 |
| 54 | " | " | " | " | " | " | " | OC$_2$H$_4$C$_6$H$_5$ | " | 429 |
| 55 | " | " | " | " | 5-CH$_3$ | 3-C$_6$H$_5$ | H | " | golden yellow | 409 |
| 56 | " | " | " | " | " | " | " | OCH$_2$C$_6$H$_5$ | golden yellow | 409 |
| 57 | " | " | " | 2-CH$_3$ | 5-CH$_3$ | " | " | OC$_2$H$_4$OC$_6$H$_5$ | golden yellow | 408 |
| 58 | " | CH$_3$ | " | " | " | " | " | OCH$_2$C$_6$H$_5$—Cl—(o) | golden yellow | 406 |
| 59 | " | " | " | " | " | " | " | OCH$_2$C$_6$H$_5$ | golden yellow | 406 |
| 60 | —CO—C$_2$H$_5$ | H | " | " | " | 2-CH$_3$ | " | " | golden yellow | 403 |
| 61 | —CO—CH$_3$ | " | " | 2-OCH$_3$ | 5-NHCOCH$_3$ | H | " | OCH$_2$C$_6$H$_5$ | reddish orange | 484 |
| 62 | " | " | " | " | " | " | " | OC$_2$H$_4$C$_6$H$_5$ | reddish orange | 484 |
| 63 | " | C$_4$H$_9$—n | " | 2-CH$_3$ | 5-CH$_3$ | " | " | OC$_6$H$_5$ | golden | 402 |

-continued

| | | | | | | | | | | |
|---|---|---|---|---|---|---|---|---|---|---|
| 64 | " | CH₃ | " | 2-OCH₃ | 5-NHCOCH₃ | 2-CH₃ | " | OC₂H₄C₆H₅ | reddish orange | |
| 65 | " | " | " | 2-OC₂H₅ | 5-OC₂H₅ | " | " | " | reddish orange | 485 |
| 66 | " | H | " | " | " | " | " | " | reddish orange | 480 |
| 67 | " | " | " | 2-OC₄H₉ | 5-OC₄H₉ | H | " | OCH₂C₆H₅ | reddish orange | 484 |
| 68 | " | " | Cl | 2-CH₃ | 5-CH₃ | H | " | " | golden yellow | 403 |
| 69 | " | " | " | " | " | " | " | OC₂H₄C₆H₅ | golden yellow | 403 |
| 70 | " | " | " | " | " | " | " | OC₂H₄OC₆H₅ | golden yellow | 403 |
| 71 | " | " | OCH₃ | " | " | " | " | " | golden yellow | 406 |
| 72 | " | " | " | " | " | " | " | OCH₂C₆H₅ | golden yellow | 406 |
| 73 | " | " | " | " | " | " | " | OC₂H₄C₆H₅ | golden yellow | 406 |
| 74 | " | " | " | 2-OCH₃ | " | 2-CH₃ | " | " | orange | 421 |
| 75 | " | " | " | " | " | " | " | " | reddish orange | 488 |
| 76 | " | " | " | " | " | " | " | OCH₂C₆H₅ | reddish orange | 488 |
| 77 | " | " | " | " | " | " | " | OC₂H₄OC₆H₅ | reddish orange | 488 |
| 78 | " | " | CH₃ | " | " | " | " | " | reddish orange | 486 |
| 79 | " | " | " | " | 5-OCH₃ | " | " | OCH₂C₆H₅ | reddish orange | 486 |
| 80 | " | " | " | 2-CH₃ | 5-CH₃ | " | " | " | golden yellow | 403 |
| 81 | " | " | " | " | " | " | " | OC₂H₄OC₆H₅ | golden yellow | 402 |
| 82 | —COC₃H₆—n | " | H | " | " | H | H | OC₂H₄OC₆H₅ | golden yellow | 403 |
| 83 | —COC₄H₉—n | " | " | " | " | " | " | " | golden yellow | 403 |
| 84 | —CO₂CH₃ | " | " | 3-CH₃ | H | " | " | " | golden yellow | 403 |
| 85 | " | " | " | " | " | " | " | OCH₂C₆H₅ | golden yellow | 402 |
| 86 | —CONH—CH₃ | " | " | 2-CH₃ | 5-CH₃ | 2-CH₃ | " | " | golden yellow | 404 |
| 87 | —CO—CH₃ | " | " | " | " | 2-Cl | 5-Cl | OCH₂COC₆H₅ | golden yellow | 410 |
| 88 | " | " | " | " | " | " | " | OCH₂COCH₃ | golden yellow | 410 |
| 89 | " | " | " | " | " | " | " | OCH₂CO₂C₂H₅ | golden yellow | 409 |
| 90 | " | " | " | " | " | " | " | OCH₂C₆H₄CH₃ | golden yellow | 410 |
| 91 | " | CH₃ | " | " | " | 3-CH₃ | H | OC₂H₄C₆H₅ | golden yellow | 402 |
| 92 | —CO—C₆H₅ | H | " | " | " | H | " | " | golden yellow | 405 |
| 93 | —CO—CH₃ | " | " | 2-OCH₃ | " | 2-CH₃ | " | " | golden yellow | 426 |
| 94 | " | " | " | " | " | " | " | OCH₂C₆H₅ | golden yellow | 427 |
| 95 | " | " | " | " | " | " | " | OC₂H₄OC₆H₅ | golden yellow | 427 |
| 96 | " | CH₃ | " | " | " | " | " | " | golden yellow | 414 |
| 97 | " | " | " | " | " | " | " | OCH₂C₆H₅ | golden yellow | 415 |
| 98 | " | " | " | " | " | " | " | OC₂H₄C₆H₅ | golden yellow | 418 |
| 99 | —CO—H | H | " | 2-CH₃ | " | 2-Cl | 5-Cl | OCH₂C₆H₅ | golden yellow | 410 |
| 100 | " | CH₃ | " | " | " | " | " | OC₂H₄C₆H₅ | golden yellow | 404 |
| 101 | —CO—CH₃ | C₆H₅ | " | 2-OCH₃ | 5-OCH₃ | H | H | " | orange | |
| 102 | COCH(C₂H₅)C₄H₉—n | C₂H₅ | CH₃ | " | " | " | " | " | " | 485 |
| 103 | COC₂H₅ | C₆H₅ | H | " | " | " | " | " | " | 377 |
| 104 | " | " | " | 2-CH₃ | 5-CH₃ | 2-Cl | 5-Cl | " | golden yellow | 411 |
| 105 | " | " | " | " | " | " | " | OCH₂C₆H₅ | golden yellow | 410 |

-continued

| | | | | | | | | | Hue | λmax |
|---|---|---|---|---|---|---|---|---|---|---|
| 106 | " | " | " | " | " | " | " | OC$_2$H$_4$OC$_6$H$_5$ | golden yellow | 411 |
| 107 | " | " | " | 2-OCH$_3$ | " | 2-CH$_3$ | H | " | orange | 426 |
| 108 | " | " | " | " | " | H | H | OCH$_2$C$_6$H$_5$ | " | 425 |
| 109 | " | " | " | " | 5-OCH$_3$ | H | " | OC$_2$H$_4$C$_6$H$_5$ | reddish orange | 486 |
| 110 | " | " | " | " | " | " | " | OCH$_2$C$_6$H$_5$ | reddish orange | 486 |
| 111 | " | " | " | " | " | " | 2-CH$_3$ | " | reddish orange | 487 |
| 112 | " | CH$_3$ | " | 2-CH$_3$ | 5-CH$_3$ | 2-Cl | 5-Cl | " | golden yellow | 405 |
| 113 | CO—C$_2$H$_5$ | " | " | " | " | " | " | OC$_2$H$_4$C$_6$H$_5$ | golden yellow | 407 |
| 114 | CON(CH$_3$)$_2$ | H | " | " | " | " | " | " | golden yellow | 405 |
| 115 | CO$_2$CH$_3$ | " | " | " | " | " | " | " | golden yellow | 406 |
| 116 | —CO—CH$_3$ | CH$_2$C$_6$H$_5$ | " | " | " | " | " | OCH$_2$C$_6$H$_5$ | golden yellow | 405 |
| 117 | " | " | " | H | " | H | H | " | golden yellow | 405 |
| 118 | " | " | " | " | " | " | " | OC$_2$H$_4$C$_6$H$_5$ | golden yellow | 405 |
| 119 | " | CH$_3$ | " | 2-CH$_3$ | 5-OCH$_3$ | 2-CH$_3$ | " | " | orange | 418 |
| 120 | " | " | " | 2-OCH$_3$ | " | H | " | " | reddish orange | 485 |
| 121 | " | " | " | " | " | " | " | OCH$_2$C$_6$H$_5$ | reddish orange | 485 |
| 122 | " | " | " | " | " | " | " | OC$_2$H$_4$OC$_6$H$_5$ | reddish orange | 484 |
| 123 | " | C$_6$H$_5$ | " | " | " | " | " | OC$_6$H$_4$—p-Cl | reddish orange | 380 |
| 124 | " | " | " | " | " | " | " | OC$_6$H$_5$ | reddish orange | 380 |
| 125 | COC$_2$H$_5$ | " | " | " | " | " | " | " | reddish orange | 378 |
| 126 | " | " | " | 2-CH$_3$ | 5-CH$_3$ | " | " | " | golden yellow | 376 |
| 127 | COCH$_3$ | " | " | " | " | " | " | " | golden yellow | 376 |
| 128 | " | " | " | " | " | " | " | OC$_6$H$_4$—p-Cl | golden yellow | 376 |
| 129 | " | " | " | 2-OCH$_3$ | " | " | " | " | orange | 378 |
| 130 | " | " | " | " | " | " | " | OC$_6$H$_5$ | " | 378 |
| 131 | COC$_2$H$_5$ | " | " | " | " | " | " | " | " | 380 |
| 132 | " | " | " | 2-CH$_3$ | " | " | " | OC$_6$H$_4$—p-Cl | golden yellow | 377 |
| 133 | CO—CH$_3$ | " | " | 2-OCH$_3$ | 5-OCH$_3$ | " | " | OCH$_2$C$_6$H$_5$ | reddish orange | 380 |
| 134 | " | " | " | " | " | " | " | OC$_2$H$_4$C$_6$H$_5$ | reddish orange | 377 |
| 135 | " | " | " | 2-CH$_3$ | 5-CH$_3$ | " | " | " | golden yellow | 376 |
| 136 | " | " | " | " | " | " | " | OCH$_2$C$_6$H$_5$ | golden yellow | 376 |
| 137 | " | " | " | 2-OCH$_3$ | " | " | " | " | orange | 378 |
| 138 | COC$_2$H$_5$ | " | " | " | " | " | " | OC$_2$H$_4$C$_6$H$_5$ | " | 378 |
| 139 | COC$_3$H$_7$ | " | " | " | 5-OCH$_3$ | " | " | OC$_2$H$_4$—p-Cl | reddish orange | 380 |
| 140 | COCH(C$_2$H$_5$)C$_4$H$_9$(n) | " | " | " | " | " | " | " | reddish orange | 380 |
| 141 | " | " | " | " | " | " | " | OC$_6$H$_5$ | reddish orange | 380 |
| 142 | CO—H | " | " | " | " | " | " | OC$_6$H$_4$—p-Cl | reddish orange | 376 |
| 143 | COCH$_3$ | " | " | " | " | " | " | OC$_2$H$_4$OC$_6$H$_5$ | reddish orange | 378 |

| Example | Formula | Hue | λmax |
|---|---|---|---|
| 144 | H-N(acetyl)—C$_6$H$_4$—N=N—(naphthyl)—N=N—C$_6$H$_4$—OC$_2$H$_4$C$_6$H$_5$ | orange | 480 |

We claim:

1. A disazo dye of the formula:

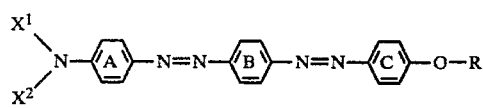

wherein R is an araliphatic or aromatic radical, $X^1$ is —CO—$R^1$, —COO$R^1$ or —CO—N($R^1$)$_2$, wherein said $R^1$ radical independently are hydrogen or an aliphatic, cycloaliphatic, araliphatic or aromatic radical; $X^2$ is hydrogen, phenyl or an aliphatic or araliphatic radical; or $X^1$ and $X^2$ form a heterocyclic radical of the formula

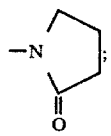

rings A, B and C optionally being substituted and rings B and C optionally being fused with a benzo ring.

2. The disazo dye of claim 1, wherein said amido radical of group $X^1$ has the formula: —CO—NH$R^1$, wherein $R^1$ is as identified above.

3. The disazo dye of claim 1, of the formula:

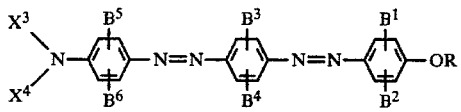

where $B^1$ is hydrogen, chlorine, methyl, ethyl, phenyl, methoxy or ethoxy, $B^2$ is hydrogen, chlorine or methyl, $B^3$ is hydrogen, chlorine, methyl, ethyl, acetylamino or $C_1$–$C_4$-alkoxy, $B^4$ is hydrogen, methyl or $C_1$–$C_4$-alkoxy, $B^3$ and $B^4$ together may also be a fused benzo ring, $B^5$ is hydrogen, methyl, chlorine or $C_1$–$C_4$-alkoxy, $B^6$ is hydrogen, methyl or $C_1$–$C_4$-alkoxy, $X^3$ is $C_1$–$C_8$-alkanoyl or benzoyl, $X^4$ is hydrogen, $C_1$–$C_4$-alkyl or phenyl, $X^3$ and $X^4$ together may also be a radical of the formula: —CO—(CH$_2$)$_3$—, and R has the stated meanings.

4. The disazo dye of claim 1, wherein said group $R^1$ is hydrogen; alkenyl; cycloalkyl of 5 to 8 carbon atoms; phenyl, methyl, ethyl or chloro substituted phenyl; or $C_1$-$C_{12}$-alkyl optionally interrupted by oxygen or optionally substituted by hydroxyl, chlorine, bromine, carbamyl, substituted carbamyl, cyano, $C_1$-$C_8$-alkoxy, $C_1$-$C_8$-alkanoyloxy, phenyl or substituted phenyl.

5. The disazo dye of claim 4, wherein said radical $R^1$ is $CH_3$, $C_2H_5$, n—$C_3H_7$, n—$C_4H_9$, n—$C_6H_{13}$, $CH_2$—$CH(C_2H_5)C_4H_9$—n, n—$C_8H_{17}$, n—$C_{10}H_{21}$, n—$C_{12}H_{25}$, —$C_2H_4OCH_2CH(C_2H_5)C_4H_9$—n, $CH_2CH=CH_2$, —$C_2H_4Cl$, —$C_2H_4Br$, —$C_2H_4OCH_3$, —$C_2H_4OC_2H_5$, —$C_2H_4OC_6H_5$, —$C_6H_{11}$, —$C_6H_5$, —$C_6H_4CH_3$, —$C_6H_4Cl$, —$C_6H_4C_2H_5$, —$CH_2$—$C_6H_5$, —$CH_2$—$C_6H_4$—$CH_3$, —$CH_2C_6H_4Cl$, —$CH_2C_6H_3Cl_2$, $CH_2C_6H_4NO_2$, —$CH_2$—$C_6H_4CN$, —$C_2H_4C_6H_5$, —$C_3H_6C_6H_5$, $C_2H_4OC_6H_5$, —$C_3H_6$—CN, —$CH_2$—$CONH_2$, —$CH_2CON(CH_3)_2$, $CH_2CON(C_2H_5)_2$, $CH_2CONHC_6H_5$, —$CH_2CO_2CH_3$, —$CH_2CO_2C_2H_5$, —$CH_2CO_2C_4H_9$, —$CH_2$—CO—$CH_3$, $CH_2COC_6H_5$, —$CH_2$—$CH(OH)C_6H_5$, —$CH_2$—$CH(OH)CH_2OC_6H_5$, —$CH_2CH(OH)C_2H_5$, —$C_2H_4OCOCH_3$, —$C_2H_4OCOC_3H_7$, —$CH_2CH(C_2H_5)OCOCH_3$, —$CH_2CH(C_2H_5)OCOC_2H_5$,

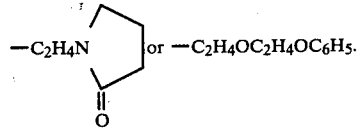

or —$C_2H_4OC_2H_4OC_6H_5$.

6. The disazo dye of claim 1, wherein radical R is phenyl, p-chlorophenyl, —$CH_2$—$C_6H_5$, —$CH_2$—$C_6H_4$—Cl, —$CH_2$—$C_6H_3Cl_2$, —$CH_2$—$C_6H_4NO_2$, —$CH_2$—$C_6H_4$—CN, —$C_2H_4$—$C_6H_5$, —$C_3H_6$—$C_6H_5$, —$C_2H_4$—O—$C_6H_5$, —$C_2H_4OC_2H_4OC_6H_5$, —$CH_2$—CO—$C_6H_5$—$CH_2$—$CH(CH_3)$—$C_6H_5$ or —$CH_2$—$C_6H_4$—$CH_3$.

7. The disazo dye of claim 1, wherein said ring B is substituted by chlorine, bromine, methyl, ethyl, acetylamino, $C_1$-$C_4$-alkoxy or phenoxy or is fused with a benzo ring optionally substituted by methoxy or ethoxy.

8. The disazo dye of claim 1, wherein said ring C is substituted by chlorine, methyl, ethyl, methoxy, ethoxy, phenyl or acetylamino.

9. The disazo of claim 1, wherein said ring A is substituted by chlorine, methyl or $C_1$-$C_4$-alkoxy.

* * * * *